(12) United States Patent
Roake

(10) Patent No.: US 8,714,077 B2
(45) Date of Patent: May 6, 2014

(54) SANDWICH BUN TOASTING AND WARMING APPARATUS

(75) Inventor: James P. Roake, Vancouver, WA (US)

(73) Assignee: James P. Roake, Vancouver, WA (US)

( * ) Notice: Subject to any disclaimer, the term of this patent is extended or adjusted under 35 U.S.C. 154(b) by 1303 days.

(21) Appl. No.: 11/999,646

(22) Filed: Dec. 5, 2007

(65) Prior Publication Data

US 2008/0173186 A1 Jul. 24, 2008

Related U.S. Application Data

(60) Provisional application No. 60/873,073, filed on Dec. 5, 2006, provisional application No. 60/902,242, filed on Feb. 20, 2007.

(51) Int. Cl.
*A47J 43/18* (2006.01)
*A47J 43/00* (2006.01)

(52) U.S. Cl.
USPC ............... 99/441; 99/426; 99/393; 99/394; 211/85.4

(58) Field of Classification Search
USPC ........... 99/441, 428, 439, 432, 426, 393, 394; 211/181.1, 133.5, 126.9, 60.1, 85.4; 249/DIG. 1, 119, 122
See application file for complete search history.

(56) References Cited

U.S. PATENT DOCUMENTS

| 1,973,817 | A | * | 9/1934 | Lang | 99/384 |
| 1,979,429 | A | * | 11/1934 | Wilkes et al. | 249/125 |
| 2,044,615 | A | * | 6/1936 | Kennedy | 99/384 |
| 3,326,119 | A | * | 6/1967 | Smith | 99/428 |
| 5,232,609 | A | * | 8/1993 | Prevost et al. | 249/102 |
| 5,690,019 | A | * | 11/1997 | Barker et al. | 99/428 |
| 6,101,930 | A | * | 8/2000 | Van Over | 99/426 |

* cited by examiner

*Primary Examiner* — Reginald L Alexander
(74) *Attorney, Agent, or Firm* — Schwabe, Williamson & Wyatt, P.C.

(57) ABSTRACT

A bun heating and toasting apparatus provides at least one elongated, inverted V-shaped bun support member formed of heat conductive material, each bun support member arranged to support a partially opened hot dog bun or other elongated bakery bun over an underlying heat source for heating and toasting of the interior surface of the supported bun. The bun support members capture the heat from the heat source in an air space between the base and the apex of the interior cavity of the inverted V-shaped support members. The bun-supporting surface of the bun support members is preferably provided with a non-stick coating or is highly polished to prevent sticking. The apparatus preferably includes enclosing, peripheral side walls that may include receivers for insertion of a removable carrier handle.

3 Claims, 3 Drawing Sheets

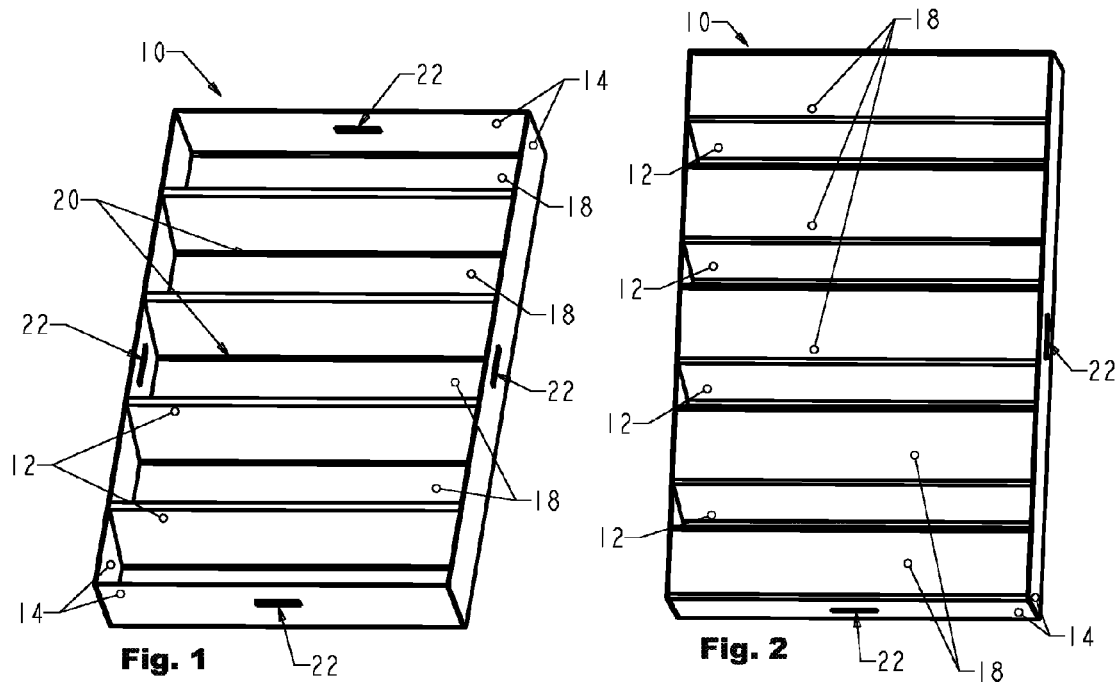
Fig. 1
Fig. 2
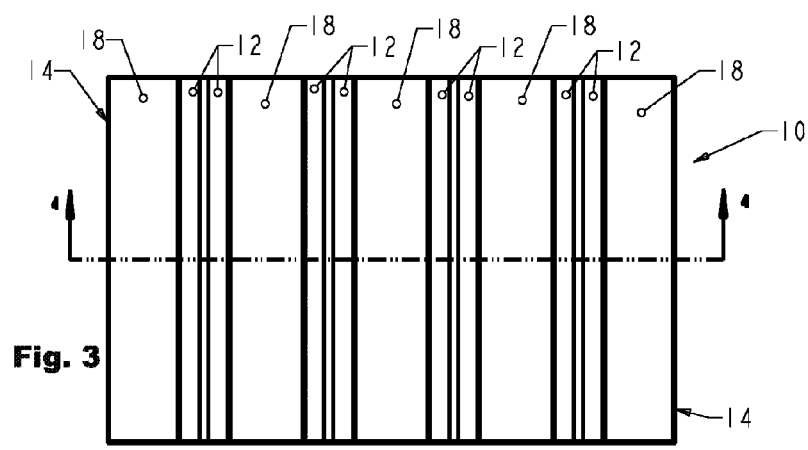
Fig. 3
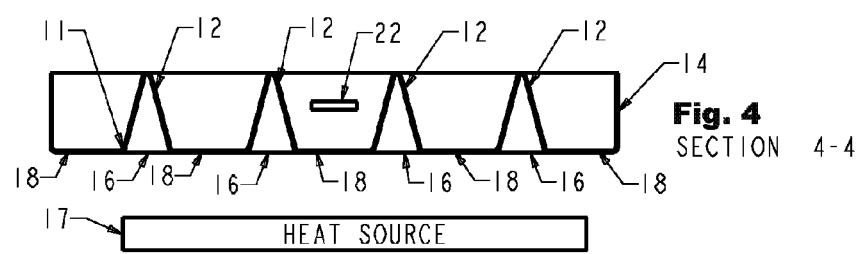
Fig. 4 SECTION 4-4

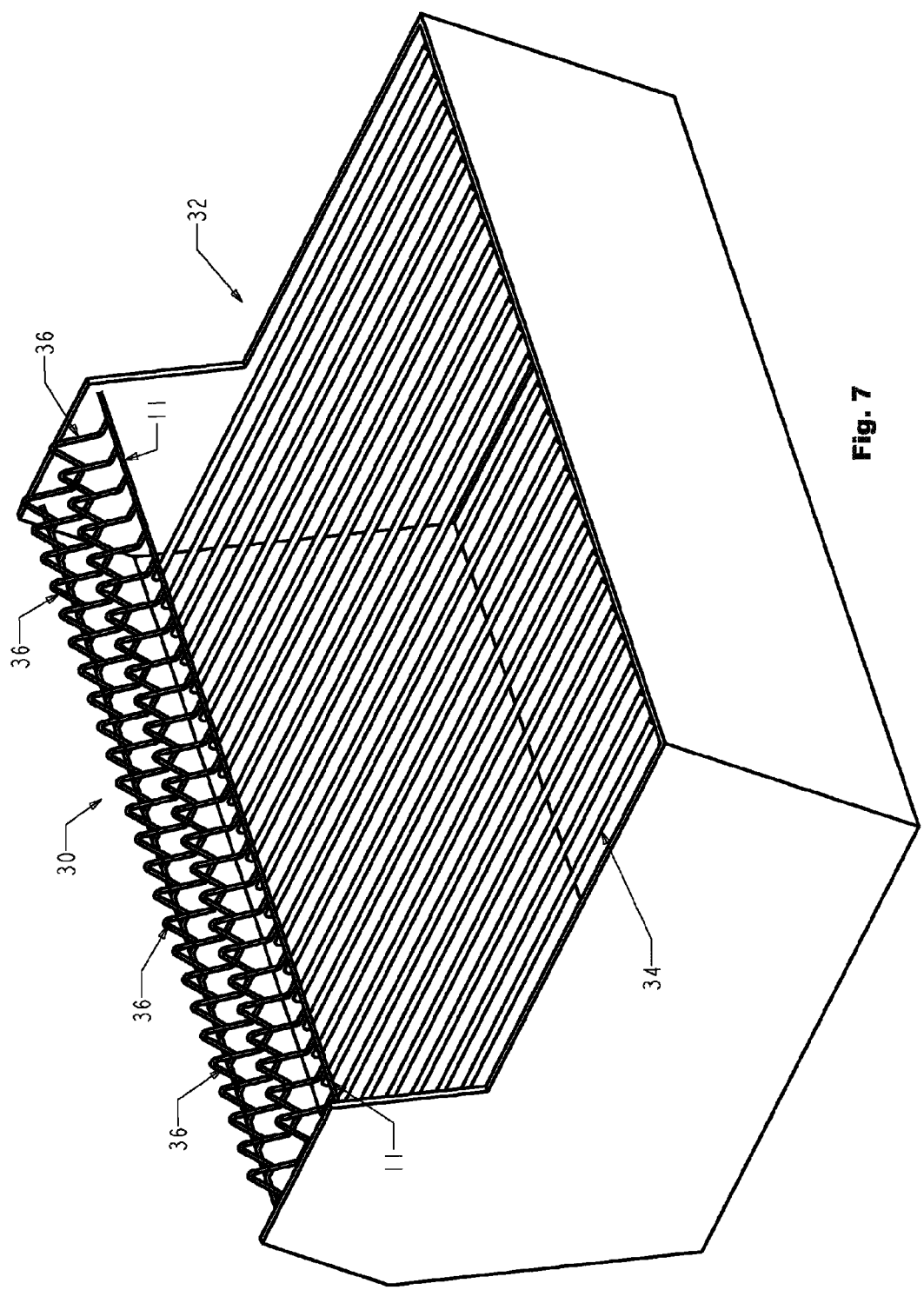

SANDWICH BUN TOASTING AND WARMING APPARATUS

This application claims benefit under 35 U.S.C. 119(e) of the priority filing of U.S. Provisional application Ser. Nos. 60/873,073, filed 5 Dec. 2006 and 60/902,242 filed 20 Feb. 2007, both incorporated herein by reference.

BACKGROUND OF THE INVENTION

This invention relates generally to warming or toasting trays and racks for hot dog buns and other elongated hinged sandwich buns, and more particularly to a bun toasting and warming apparatus arranged to hold one or more buns in an open condition over a source of heat for toasting the interior surface portions of one or more empty buns without weakening or damaging the hinge structure of the bun.

Currently, in order for one to toast the inside surfaces of a hot dog bun, sausage bun, submarine sandwich bun, or other elongated hinged bun, the bun must be spread open so as to be able to lay the bun flat onto a grill, baking sheet or other hot surface. The toasting of the interior surfaces of the bun desirably changes and enhances the taste and texture of the resulting bun.

However, when opening the bun sufficiently fully to permit adequate toasting and warming of the inside surfaces of the bun, most times the hinge structure of the bun is either broken, torn or weakened to a point where it cannot support placement of the wiener, sausage, other ingredients, condiments and fillings in the bun. This destruction of the hinge structure often results in the inserted contents ultimately falling out thru the hinge side of the bun before or during eating.

Given the resulting problems of toasting hot dog and other elongate bakery buns, a less desirable bun is often provided, one that is either cold or warmed merely on the outside. Therefore, it is apparent that a need exists for a simple, reliable and effective bun toasting and warming apparatus that may be made available to both the individual user and the commercial service industry to provide a more desirable sandwich product for the consumer.

SUMMARY OF THE INVENTION

In its basic concept, the bun toasting and warming apparatus of this invention provides a cradle-like rack or tray apparatus arranged for support above an underlying source of heat, the rack apparatus including one or more generally inverted, V-shaped bun supports each arranged to receive and support one or more buns in a partially opened condition with its open interior disposed above and facing toward the underlying source of heat. The bun supports may include perforations or openings arranged to permit substantially unrestricted passage of heat to the interior of supported buns from the underlying source of heat.

It is by virtue of the foregoing basic concept that the principle objective of the present invention is achieved; namely, the provision of a bun toasting and warming apparatus that provides for the toasting and warming of the interior confines of hot dog buns and other hinged type bakery buns and sandwich loaves without breaking, damaging or otherwise weakening the hinge structure of the bun.

Another object and advantage of the present invention is the provision of a bun toasting apparatus of the class described which may be provided in the form of a portable tray or rack apparatus which may be placed over an underlying source of heat such as stove tops and elements, lower elements of ovens, campfire racks, grills and barbecues among others.

Another object and advantage of the present invention is the provision of a bun toasting and warming apparatus of the class described which may be provided in the form of a rack or tray member mounted on a barbecue apparatus and supported above a cooking surface of the barbecue for toasting buns while foods are cooking on the normal cooking surface of the barbecue.

Yet another object and advantage of the present invention is the provision of a bun toasting apparatus in which the inverted, generally V-shaped bun supports may be provided in the form of solid metal sheet material, or alternatively sheet material having openings or perforations therethrough, or of spaced apart wire rod stock as may be desired for the intended use, speed of toasting, heat source available and other factors as may be encountered.

A further object and advantage of the present invention is the provision of a bun toasting and warming apparatus of the class described which may be formed as a tray member wherein the bun support members may be surrounded by an upstanding peripheral wall structure and an enclosing floor panel structure between adjacent upwardly projecting bun support members for forming troughs between bun supports for holding water for steaming if desired, or for holding foods to be kept warm after cooking while buns are being toasted, illustrative examples of such foods being corn-on-the-cob, finished hot dogs and sausages and others.

A further object and advantage of the present invention is the provision of a bun toasting and warming apparatus which may be formed as a single, stamped unit using a selected gauge of tin, aluminum or other metal foil material to provide an inexpensive, disposable apparatus in similar manner as disposable pie pans, roasting pans and other items have been provided for discard after single uses.

A still further object and advantage of the present invention is the provision of a bun toasting and warming apparatus of the class described which is of simplified construction for economical manufacture and reliability and durability of use.

The foregoing and other objects and advantages of the present invention will appear from the following detailed description, taken in connection with the accompanying drawings of preferred embodiments.

BRIEF DESCRIPTION OF THE DRAWINGS

FIG. 1 is a top perspective view of a first embodiment of a bun toaster embodying features of the present invention.

FIG. 2 is a bottom perspective view of the bun toaster of FIG. 1.

FIG. 3 is a top plan view of the toaster of FIG. 1.

FIG. 4 is a sectional view taken along the line 4-4 in FIG. 3.

FIG. 7 is a front perspective view of a barbeque apparatus supporting yet another embodiment of the bun toasting apparatus of the present invention.

DESCRIPTION OF THE PREFERRED EMBODIMENTS

Figure 5:
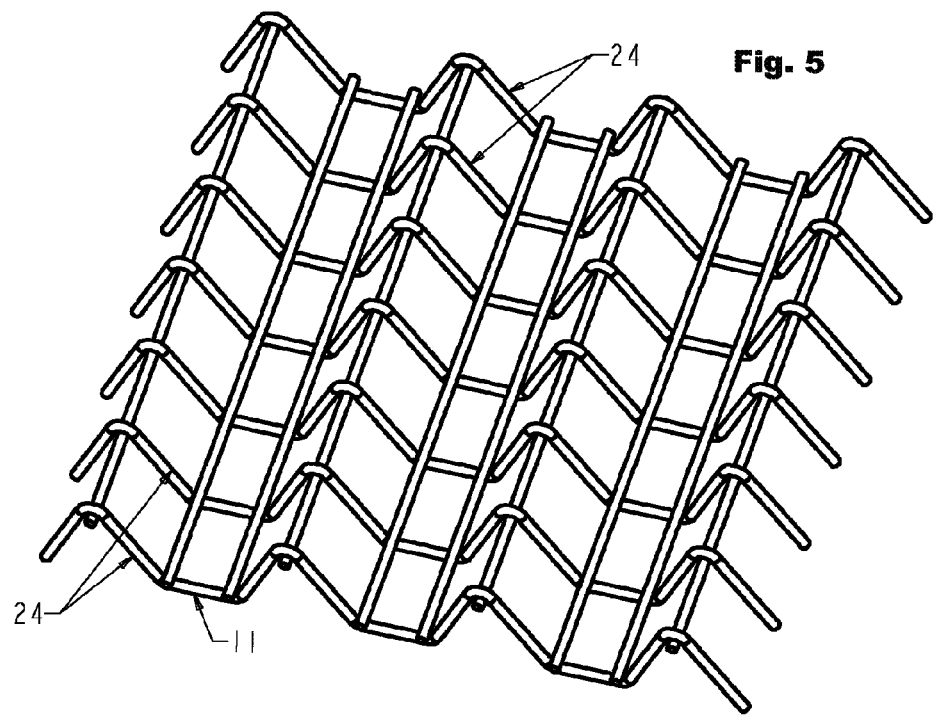
FIG. 5 is a top perspective view of a second embodiment of a bun toaster embodying features of this invention and formed of a plurality of individual wire rods secured together to form a plurality of bun support members.

The present invention provides a bun warming and toasting apparatus 10 formed as a tray or rack member 10 having at least one, and preferably a plurality of laterally spaced-apart, longitudinally-elongated, inverted V-shaped bun support members 12 projecting vertically upward from a base support 11 of the rack member. The bun support members 12 function, when heated, as heating and toasting surfaces for hot dog buns, sausage buns and other elongated, hinged bakery buns placed thereon and supported in a partially opened condition thereon during operation of the apparatus. The apparatus preferably, although not necessarily includes peripheral side walls 14 surrounding and enclosing the bun support members 12, as seen clearly in FIG. 1.

The bun supports 12 are formed of a heat conductive material, normally a metal such as aluminum, steel or cast iron. The interior cavities 12' of the inverted V-shaped bun support members are open at their bottom ends 16 to allow heat from an underlying heat source 17 to flow directly up into the cavity space. The heat flowing up into the interior confines 12' of the bun supports 12 effectively turns the surfaces of the inverted V-shaped supports into hot plates that serve to toast the inside of a partially opened bun straddling the support member. A hot and toasty bun is the resulting finished product.

In the embodiment illustrated in FIGS. 1-4, the plurality of V-shaped bun supports 12 are secured together at their bottom, open ends 16 by interconnecting bottom floor panels 18 which, together with the open, bottom ends of the bun supports, form the bottom side of the toaster apparatus 10, and also form intermediate troughs 20 between the adjacent, upstanding, laterally spaced-apart bun support members 12. Alternatively, a bottom plate (not shown) may be provided to support a plurality of individually mounted, inverted V-shaped bun support members if it is desired that the apparatus have a continuous, solid, flat bottom surface on its underside.

Normally however, it is preferred that the interior cavity 12' of each bun support member 12 remain open for facilitated heating of the bun support member and bun placed thereon, as previously described. The extrusion method allows for the upstanding bun supports and bottom walls 18 to be formed as a single extrusion of aluminum or other heat-conductive material that may be desired. The number of spaced bun supports 12 and their length is determined by operational capacity desired, for example, for low-volume uses or higher-volume, commercial uses.

Preferably, the inverted V-shaped bun support members 12 are either highly polished or covered with TEFLON® or other nonstick material to prevent buns from sticking to the toasting surfaces. Also, if desired, the upstanding bun support sheet members 12 may be provided with perforations (not shown), openings (not shown), or a selected perforate surface configuration (not shown) if needed or desired for allowing direct heat flow therethrough and onto the interior surface of a bun supported thereon from the interior cavity 12' and underlying heat source 17 such as a supporting grill. Such openings or perforations will facilitate toasting and heat recovery in both lower heat situations and in higher volume, commercial use situations.

In this regard, the solid surface bun support members 12 illustrated in FIGS. 1-4 may alternatively be formed, as shown in the second embodiment of FIG. 5, of a plurality of longitudinally spaced-apart wire rods mounted on the base support 11 to form the inverted V-shaped bun support members 24. The spaces between the wire rods forming the bun support members 24 form openings to the bun from the interior cavity area of the bun support members and underlying heat source for facilitated toasting of the interior surfaces of a bun supported in partly open condition on the base support members 24.

Figure 6:
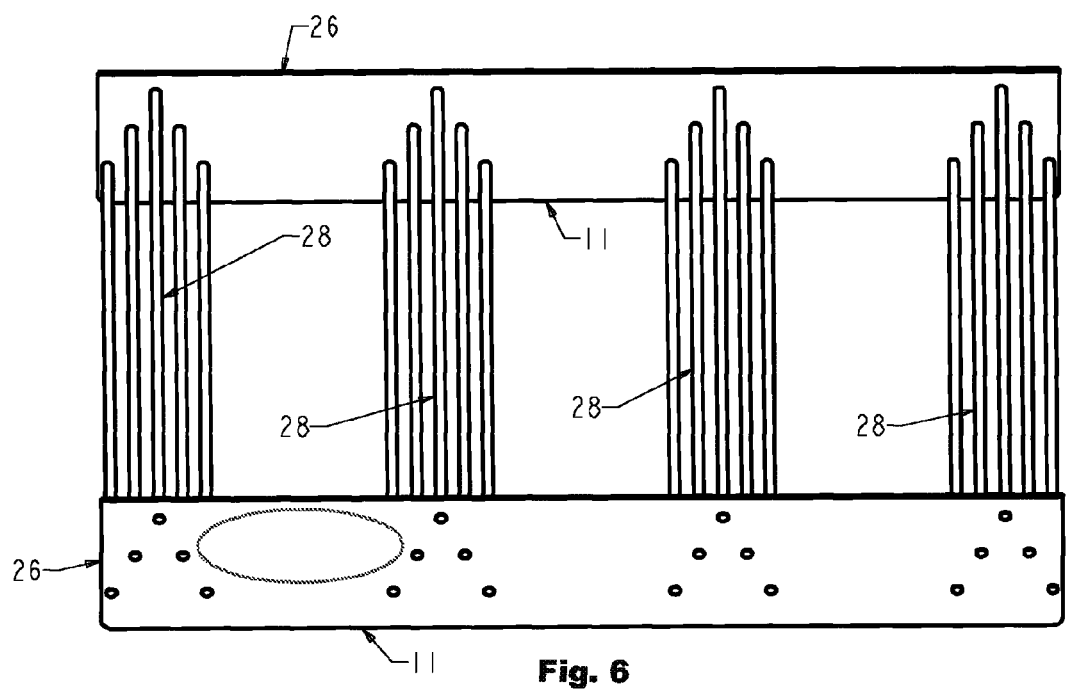
FIG. 6 is a top perspective view of a third embodiment of a bun toaster utilizing wire rod members in the provision of the bun support members.

FIG. 6 illustrates another embodiment of the toaster apparatus of this invention utilizing a plurality of individual, laterally spaced-apart, straight wire rods secured together at their opposite longitudinal ends to end plate members 26 which serve as the base support 11, and is arranged to form a plurality of longitudinally elongated bun support members 28. The spaces formed between individual rod members form openings to the interior cavity area of the bun support members and underlying heat source for facilitating the toasting of the interior surfaces of the supported bun as described in connection with the previous embodiments.

FIG. 7 illustrates yet another embodiment of a toaster apparatus embodying features of the present invention in the form of a wire rack apparatus 30 arranged for mounted support on a barbecue apparatus 32 above the grill surface 34 thereof. As shown in the particular embodiment illustrated, the base support members 11 of the wire rack member 30 support a plurality of wire rods arranged to provide a pair of spaced-apart, longitudinally-elongated bun support members 36, 36' arranged to extend across the width of the barbeque, each elongated bun support member arranged to support a plurality of buns (not shown) placed thereon in end-to-end condition for toasting. This arrangement provides for bun toasting operation of the barbeque while the grill apparatus 34 of the barbeque is also in use cooking hot dogs and other foods. This arrangement also illustrates that the bun support members may be provided in a selected number and orientation as may be desired for optimum use and productivity of the barbeque apparatus.

With reference again to the first embodiment of the invention shown in FIGS. 1-4 of the drawings, as will be apparent in viewing FIGS. 1, 3 and 4, one or more of the troughs 20 formed between adjacent bun supports 12 may, when the apparatus includes enclosing peripheral side walls 14, be utilized to receive a desired volume of water which during operation of the toaster apparatus is heated and turned to steam. An overlying lid member (not shown) may be provided to cover the open top end of the apparatus to confine the steam for steaming of the exterior surface of buns supported for toasting on the bun supports 12, and for other foods, such as corn on the cob, that may, if desired, be placed in the intermediate troughs 20 between the bun support members 12.

The apparatus 10 may as illustrated also include means to facilitate removing the hot apparatus 10 from the heat source and the carrying of the apparatus and toasted buns to a location where it is desired to remove the buns for preparation of the sandwich. In the embodiment illustrated, one or more of the peripheral side walls 14 is provided with a slot 22 arranged to receive a removable carrying handle member (not shown).

The toaster of this invention is designed for individuals and commercial users who desire the advantages of providing heated and toasted hot dog and other buns over unheated and un-toasted buns. The toaster apparatus is designed to be very light and portable. It is designed to sit on an outdoor barbeque grill, stovetop grill, electric or gas stovetop heat element, or on racks or even on rocks positioned to support it above hot coals or a campfire, and virtually any other place an adequate, underlying heat source may be found at outdoor cookouts, tailgate cooking, camping, home, commercial vending businesses, or any other place and event where the qualities of a hot, toasted bun is appreciated.

The toaster can be made using virtually any selected manufacturing method including extrusion process, casting process, bending or forming process, and stamping process. Side walls when desired, may be affixed by spot welding, soldering, welding, formed in the stamping process, or provided by any other method suitable for the purpose.

The toaster of this invention may if desired also be made as a disposable product. In this regard, the apparatus 10 may be formed as a single, stamped unit using a selected thin gauge of tin, aluminum or other foil material, or other selected malleable, lightweight, heat conductive material that is of relatively low cost to allow for such disposability, as has been well known in the provision of disposable and single-use pie pans, roasting pans and other items.

From the foregoing it will be apparent to those skilled in the art that the bun toasting and warming apparatus of this invention permits toasting of the inside surfaces of hot dog buns and other elongated. hinged bakery buns without destroying, weakening or otherwise damaging the hinge structure of the bun. A warm and toasted bun has been found to make a superior and usually more desirable product to that of a cold bun or one that is only partially warmed on its outside surfaces as has been heretofore typical. The toasting of the inside of the bun gives the bun a texture different from that of a cold or slightly warmed bun, and the present invention allows that one only need to find a suitable source of underlying heat such as a barbecue grill or a stove top and place the toasting apparatus of this invention on the heat source and allow it to warm. Once the apparatus has been warmed, one only needs to slightly open the bun opposite its hinged side and gently slide the bun downwardly onto the desired bun support member and then later remove the bun when the desired heating or toasting has been accomplished The bun toasting apparatus of this invention may be provided in a portable form to allow the toaster to be placed on stove top grills and elements, barbecue grills, campfire racks and other similar sources of underlying heat. In this manner, those skilled in the art will recognize that campers, picnickers and tailgate partygoers have the resource to heat or toast buns for their hot dogs, sausages and sandwiches and produce a more desirable sandwich product. As will also be apparent to those skilled in the art, the bun support members may as illustrated herein be surrounded within a confining peripheral wall structure and separated by a closed panel floor structure whereby to form closed troughs between adjacent bun support members that are capable of holding an amount of water which, when heated during operation of the toasting apparatus, will provide steam if desired to maintain the exterior of the bun in warm soft condition. Also, the length of the inverted V-shaped bun support members may be determined at manufacture either by the intended length of bun to be toasted or by total length of multiple buns to be placed end-to-end on each support. As such, the length and width of the toaster apparatus becomes a function of desired toaster capacity and the available area of the underlying heat source. These dimensional factors may be adjusted according to the intended use of particular apparatus manufactured, for example, for use in low volume, individual cooking situations or for high volume commercial situations.

It will be apparent to those skilled in the art that many changes other than those already described can be made in the size, shape, type, number and arrangement of parts described herein without departing from the spirit of this invention and the scope of the appended claims.

Having thus described my invention and the manner in which it may be used, I claim:

1. An apparatus for toasting the inside surfaces of hinged, elongated sandwich buns, comprising:
    a rack member having a base adapted to be positioned above a heat source;
    a plurality of upwardly-extending, solid surfaced, inverted V-shaped bun support mounted on the base, each of the at least one bun support arranged to receive a partially open bun on an upper surface so the bun faces the heat source for toasting, the at least one bun support also including a lower surface that is entirely open at a bottom end to allow heat from the heat source to flow directly up to the lower surface; and
    upright, peripheral walls surrounding and enclosing the rack member but not having a floor between the walls, thereby preventing heat from reflecting off of a floor the peripheral walls being connected to peripheral edges of the base.

2. The apparatus of claim 1, wherein at least one of the peripheral walls defines at least one opening into which a handle can be removably mounted.

3. The apparatus of claim 2, further comprising the handle that is mounted to at least one of the openings in the peripheral walls.

\* \* \* \* \*